US010649710B2

(12) United States Patent
Capt et al.

(10) Patent No.: US 10,649,710 B2
(45) Date of Patent: May 12, 2020

(54) ELECTRONIC CONTENT SIMULATION FOR DIGITAL SIGNAGE

(71) Applicant: Adobe Inc., San Jose, CA (US)

(72) Inventors: Alexandre Capt, Landser (FR); Julien Ramboz, Leymen (FR); Tobias Bocanegra, Tokyo (JP); Damien Antipa, Saint-Louis (FR)

(73) Assignee: Adobe Inc., San Jose, CA (US)

( * ) Notice: Subject to any disclaimer, the term of this patent is extended or adjusted under 35 U.S.C. 154(b) by 443 days.

(21) Appl. No.: 15/243,092

(22) Filed: Aug. 22, 2016

(65) Prior Publication Data
US 2018/0052646 A1 Feb. 22, 2018

(51) Int. Cl.
| | | |
|---|---|---|
| G06F 3/14 | (2006.01) | |
| G09G 5/30 | (2006.01) | |
| G09F 9/33 | (2006.01) | |
| G09F 9/35 | (2006.01) | |
| G06F 3/147 | (2006.01) | |

(52) U.S. Cl.
CPC .............. *G06F 3/14* (2013.01); *G06F 3/147* (2013.01); *G06F 3/1454* (2013.01); *G09F 9/33* (2013.01); *G09F 9/35* (2013.01); *G09G 5/30* (2013.01); *G09G 2300/026* (2013.01); *G09G 2370/02* (2013.01); *G09G 2370/022* (2013.01); *G09G 2370/16* (2013.01); *G09G 2380/06* (2013.01)

(58) Field of Classification Search
CPC ......... G06Q 30/0252; H04N 21/44218; H04N 21/812; H04H 60/45; H04H 60/46; H04H 60/06; H04H 60/33
See application file for complete search history.

(56) References Cited

U.S. PATENT DOCUMENTS

| | | | | |
|---|---|---|---|---|
| 8,239,840 | B1* | 8/2012 | Czymontek | G06F 8/34 |
| | | | | 717/125 |
| 2004/0036622 | A1* | 2/2004 | Dukach | G06Q 30/02 |
| | | | | 340/691.6 |
| 2006/0143082 | A1* | 6/2006 | Ebert | G06Q 30/02 |
| | | | | 705/14.72 |
| 2011/0016483 | A1* | 1/2011 | Opdycke | G06Q 30/02 |
| | | | | 725/14 |
| 2014/0168032 | A1* | 6/2014 | Swan | G06F 3/1446 |
| | | | | 345/1.3 |
| 2016/0283352 | A1* | 9/2016 | Kraus | G06F 3/0482 |
| 2016/0314224 | A1* | 10/2016 | Wei | G06F 30/20 |

* cited by examiner

*Primary Examiner* — Jennifer N To
*Assistant Examiner* — Eric J Yoon
(74) *Attorney, Agent, or Firm* — Brake Hughes Bellerman LLP

(57) ABSTRACT

Provided are methods and systems for simulating context-dependent electronic content on a separate digital sign. A user creates context-dependent electronic content for a separate digital sign, and associates the electronic content with context rules for displaying the content. The context-dependent electronic content is then displayed on a digital sign, such as in a normal display mode. To simulate the electronic content, a user selects simulation parameters for the simulation. An electronic content management system then configures the simulation parameters into a simulation protocol. When the simulation protocol is executed at the digital sign, digital sign displays the electronic content based on the simulation protocol, irrespective of the context associated with the sign. The simulation can continue, for example, until the user terminates the simulation.

17 Claims, 6 Drawing Sheets

ELECTRONIC CONTENT SIMULATION FOR DIGITAL SIGNAGE

TECHNICAL FIELD

The present disclosure relates generally to digital signage, and more particularly to methods and systems for remotely simulating context-dependent electronic content on a digital sign.

BACKGROUND

With the availability of lower-cost digital display screens, including flat-panel liquid crystal displays (LCD) and light-emitting diode (LED) displays, the use of digital screens to display digital "signs" has grown significantly in recent years. For example, digital signs that display electronic content can be found at most indoor and outdoor public spaces, including transportation stations, airports, museums, stadiums, retail stores, hotels, restaurants, corporate buildings, and other public venues. Such signs can be used for a variety of purposes, from wayfinding to marketing and advertising.

In addition to providing static content like that provided on painted billboard signs, digital signs advantageously allow the display of dynamic content, including context-dependent dynamic content, i.e., content that changes based on the contextual environment in which the sign is displayed. For example, a digital sign can be configured with context-dependent content that displays a bathing suit ad during the day and a pillow ad at night.

Although digital signs are very useful, authors of electronic content for digital signs are often unable to adequately know how their created content will actually appear on the digital signs for several reasons. First, many digital signs have large layouts, have unusual dimensions or aspect ratios, use multiple screens to display a single image, and/or have other display characteristics and constraints that present content in ways that differ from how the content appears on other devices, such as on a small laptop screen (which authors often use to develop the electronic content). Second, the context-dependent nature of much of the electronic content that is used on digital signs makes it difficult for authors to see if the electronic content is performing as expected in those different contexts. For example, to ensure that context-dependent content is correctly configured to display a bathing suit ad during the day and a pillow ad at night on a digital sign, the author must conventionally check the content during the day and wait until night to check the content again.

Because of these compounding challenges and constraints—i.e., the unpredictable layout and screen sizes of digital signs and the display of context-dependent content—simulation of electronic content on a user's screen is not adequate. In other words, it is not really possible to replicate the content of a digital sign on the content author's screen. As such, the author of the electronic content will never actually know what will be eventually displayed on a digital sign, even with a simulation. Authors of electronic content for digital signs thus usually lack confidence that the end result of their efforts will be what they expect. And even when simulations are attempted, such as with the user's device acting as the display, such attempted simulations are usually cluttered with numerous control buttons and other features that obscure the attempted simulation view.

SUMMARY

Methods and systems for simulation of context-dependent electronic content on a separate digital sign are disclosed herein. Certain embodiments of the invention involve a computing device transmitting the electronic content and a context rules to a separate digital sign. Application of the context rule provide different appearances of the electronic content on the digital sign based on different contexts at the digital sign. The computing device receives a user input specifying a simulation parameter for the electronic content and generates a simulation protocol for displaying a simulation of the electronic content on the digital sign. The computing device transmits the simulation protocol to the digital sign for simulation at the digital sign. The electronic content is then simulated at the digital sign according to the simulation protocol.

Other embodiments of the invention involve a digital sign receiving electronic content and context rules for displaying the electronic content. The digital sign applies the context rules to display the electronic content, using the context rules to provide different appearances of the electronic content on the digital sign based on different contexts at the digital sign. The digital sign receives a simulation protocol for displaying a simulation of the electronic content on the digital sign and displays the electronic content according to the simulation protocol.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

The features, embodiments, and advantages of the present disclosure are better understood when the following Detailed Description is read with reference to the accompanying drawings.

DETAILED DESCRIPTION

Overview

Figure 1:
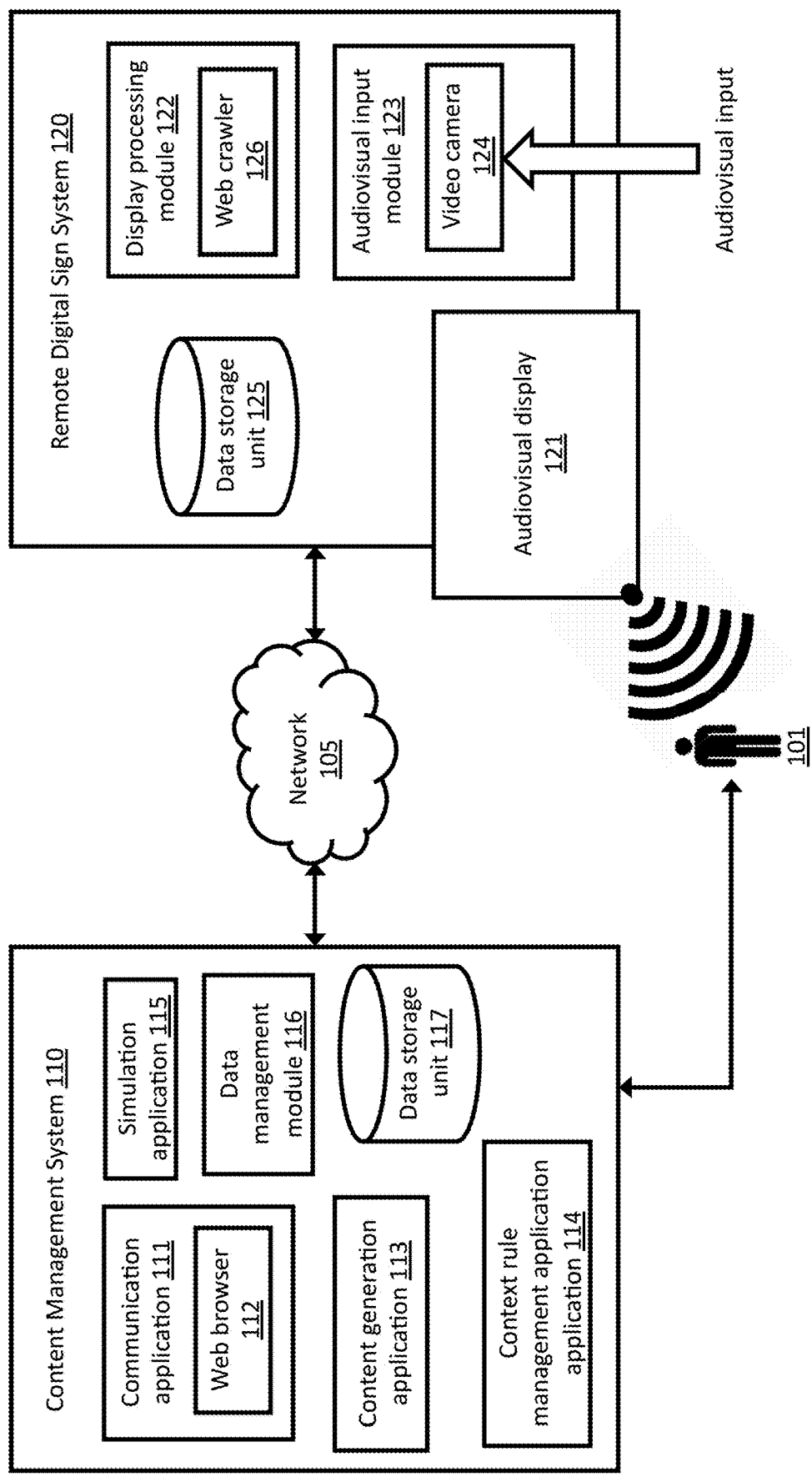
FIG. 1 is a block diagram of a computer network environment and system for simulating context-dependent electronic content on a digital sign, in accordance with certain example embodiments.

As described herein, provided are methods and systems for simulating context-dependent electronic content on a separate digital sign. A user creates electronic content for a digital sign. The user also uses a content management system (CMS) to create context rules for applying the electronic content. The CMS transmits the electronic content, along with the context rules, to a digital sign that then displays the content according to the context rules. To simulate the electronic content in a particular context, a user provides simulation parameters via the CMS. The CMS transmits a simulation protocol to the digital sign. The digital sign then displays the electronic content based on the simulation protocol, irrespective of the actual context associated with the sign. For example, if a context rule triggers a bathing suit ad during the day and a pillow ad at night, the simulation protocol will allow the digital sign to display the pillow ad at any time (not just at night) or the bathing suit ad at any time (not just during the day). In other words, when the digital sign receives the simulation protocol, the digital sign displays the electronic content based on the simulation protocol, thus allowing the user to simulate the content on the digital sign in particular contexts that differ from the actual context at the digital sign.

In one example, a user creates and deploys electronic content via the CMS to the digital sign. The content can be any context-dependent content appropriate for a digital sign, including dynamic content and audio. For example, a user can create a bathing suit ad to be displayed during the day and a pillow ad to be displayed at night. In another example, the user may create a rain gear ad to be displayed when raining (or when the sounds of thunder are detected at the digital sign), ski gear to be displayed when snowing (or during colder temperatures), a sunscreen ad to be displayed when the temperature at the sign location is above 90 degrees Fahrenheit, etc. In other examples, the content may be reactive to customer input. For example, a customer may touch the digital sign and input preferences, thereby invoking context-dependent content related to the customer's preferences. In other examples, the content may be suited for a crowd rather an individual customer, such as a sign relating to a wait time at a restaurant. As such, a user can create a variety of context-dependent contents for digital signs.

So that the created content is displayed in the correct, context-dependent manner, the user can also employ the CMS to specify context rules that implement the context-dependent electronic content. For example, the user may separately create the electronic content and specify context rules for the electronic content, such as by selecting various context on a user interface of the CMS. If the user creates content for a bathing suit ad and a pillow ad, for example, the user can use the CMS to specify context rules that dictate when the ads will be displayed. For example, the user-specified rules can cause the bathing suit ad to be displayed when a "time context" is daytime and the pillow ad to be displayed when the "time context" is night. Likewise, a "weather context" rule may dictate that rain gear is displayed when it is raining outside while ski gear is displayed when it is snowing. Or, when sounds of wind are detected, a context rule may dictate that a winter hat ad is displayed.

In this way, the context-dependent electronic content is attached to (or otherwise associated with) the context rules and deployed to the digital sign such that the digital sign displays the appropriate content according to the rule. The different contents, and hence different appearances on the digital sign for the different contents, are selected by executing logic implementing the context rules, which in turn determines the current context and provides the correct context-dependent content accordingly.

To view specific electronic content on the digital sign, irrespective of the actual context at the digital sign, a user can employ the methods and systems provided herein to remotely run a simulation of electronic content on the digital sign. To initiate the simulation, the user provides simulation parameters to the CMS. The CMS then generates a simulation protocol, based on the user's selected simulation parameters, and transmits the simulation protocol to the digital sign. The digital sign then displays content according to the simulation protocol. For example, the user may specify a simulation parameter for the bathing suit ad. Based on the user's input, the CMS generates and deploys a simulation protocol that—when executed at the digital sign—causes the bathing suit ad to be displayed on the digital sign, even if the actual context is night. As such, the ad simulation can occur regardless of the actual context at the location of the digital sign.

In certain examples, the simulation parameters that the user specifies include simulation contexts (e.g., raining, night, crowded, temperature, windy/calm, time of day, etc.) for running a simulation on the digital sign. In such examples, the user can, via the CMS, identify the specific simulation contexts the user desires to simulate. The CMS then generates a simulation protocol and transmits the protocol to the digital sign, which then displays the electronic content based on the protocol. For example, the user may specify a "raining context" to see how a rain gear ad appears on the digital sign (even when it is not raining). Or, the user may specify a cold temperature context to see how snow gear ads appear on the digital sign (even if it is warm outside). As those skilled in the art will appreciate in view of the methods and systems described herein, a variety of different context simulations can be performed for a variety of different contexts associated with the digital sign.

After initiating and running a simulation on the digital sign, the user can discontinue the simulation via the CMS. For example, the user can provide an input into the user interface of the CMS providing an instruction to cease the simulation and return to normal mode. The CMS then transmits the instruction to the digital sign, which then ceases the simulation and returns to the normal mode. In the normal mode, for example, the digital sign returns to displaying the electronic content according to the context rules. For example, the digital sign will display a bathing suit ad during the day and the pillow ad at night.

By permitting remote control simulations of context-dependent content on a digital sign, the methods and systems taught herein provide a convenient and efficient way for the author of the electronic content to view how his or her content will actually appear when displayed. This includes the display of the content without the simulation being obscured with simulation controls and other features on a simulated digital sign. Among other benefits, the author is given the confidence that the content that he or she prepared will work as expected in the various contexts for which it is configured and will fit and otherwise appear as desired for the actual digital sign display characteristics. The author will not need to wait for actual conditions to occur or attempt to change the real world (e.g., by turning off lights to simulate night or changing an electronic device clock). The methods and systems herein thus greatly improve the processing efficiency and effectiveness of systems used to deploy electronic content for digital signs.

Definitions

As used herein, the phrase "electronic content" refers to any type of digital subject matter that can be displayed or used on a digital sign. Examples of "electronic content" include digital images, text, videos, drawings, illustrations, graphics, sounds or general audio, digital photographs, streaming media, and the like. Such electronic content is often used, for example, to create advertisements (or ads) for digital signs. The phrase "electronic content" is also used herein interchangeably with, and hence has the same meaning as, the phrase "digital content."

As used herein, the phrases "digital sign" and "digital signage" refer to a sign that displays electronic content. Such signs rely on, for example, the use of technologies such as LCD, LED, and projection to display electronic content. Digital signs can often be found in public spaces, transportation systems, museums, stadiums, retail stores, hotels, restaurants, and corporate buildings etc., to provide wayfinding, exhibitions, marketing and outdoor advertising. A digital sign can include a single display or multiple displays, such as multiple displays that, when viewed together, form all or part of a single sign or multiple signs.

As used herein, the phrase "separate" with respect to a digital sign being separate from another computing device refers to a digital sign being a distinct device from the other computing device. A digital sign communicates through a wired and/or wireless network or otherwise with the other computing device. In one example, a separate digital sign is in the same room as a user that is using another computer to control the digital sign over a local area network connection. In another example, the separate digital sign is at a merchant location in a different town from a user that is using the other computer to control the digital sign over an Internet-based network connection.

As used herein, the term "display" is used as a noun to mean an electronic device for the visual presentation of data or information, such as electronic content. For example, a computer monitor or television screen is a "display." As a verb, the term "display" refers to the presentation or exhibition of data or information where it can be viewed. For example, to display an ad means to place the ad where it can be seen. With regard to sounds or other audio, the verb form of "display" as used herein means to project the sound or audio or otherwise make the sound audible.

As used herein, the term "context" refers to the environmental circumstances, characteristics, qualities, traits, or features associated with a digital sign or the location in which the digital sign is present. The term includes, for example, any environmental circumstance, characteristics, qualities, traits, or features that may change at or near the sign. Example contexts include the time of day/night at or near where the sign is located, the weather conditions at or near where the sign is located (rainy, sunny, cold, hot, snowy, windy, etc.), the number of customers at a merchant location at or near where the sign is located (i.e., how crowded the merchant is), the gender appearance(s) of one or more customers at a merchant location where a sign is located, the lighting at a merchant location, and other variable and/or dynamic environmental circumstance at or near where a digital sign is located.

As used herein, the phrase "context-dependent electronic content" refers to any electronic content that can be displayed on a digital sign according to a context at or near the digital sign. For example, an electronic content, such as an ad for a pillow, sleep aid, bed, or sheets or blankets, can be associated with a time-of-day context, i.e., night time. Likewise, other electronic content can be associated with a weather context. For example, ads for sunglasses, sunscreen, swimsuits, and the like can be associated with a sunny weather context, whereas raingear or umbrella ads can be associated with a rainy weather context. If a restaurant is very crowded, for example, text and related graphics on a digital sign indicating a long wait time can be associated with a crowded context.

As used herein, the phrase "context rule" refers to computer logic and programming that is used to display a particular electronic content on a digital sign according to a particular context. As an example, a context rule includes logic and programming that causes a pair of sunglasses to be displayed as an ad on a digital sign during sunny weather. A different but related context rule may cause a rain gear ad to be displayed on the same digital sign during rainy weather. Hence, in this example, the context rules cause the electronic content (sunglasses or rain gear) to be displayed according to a particular context (a weather context, i.e., either sunny or rainy, respectively).

As used herein, the terms "simulate," "simulation," or "simulating" refer to reproducing the behavior of particular context-dependent electronic content on a digital sign, irrespective of the context in which the ad is displayed. As an example, a simulation for a sunglasses ad associated with a sunny weather context could occur when it is raining, cloudy, or sunny outside. Or, as another example, a simulation of a pillow ad that is associated with a nighttime context could be displayed during the daylight hours (out of context) or during the night (in context).

As used herein, the phrase "simulation parameter" refers generally to a user-specified feature or group of features that the user would like to simulate on a separate digital sign. The simulation parameter may be a particular context-dependent electronic content that the user wishes to display on the digital sign, regardless of the context. For example, a user may specify a particular ad, such as a pillow ad, that the user wants to display, regardless of the context. In another example, the simulation parameter includes one or more user-specified simulation contexts for displaying context-dependent electronic content on the digital sign. For example, the user may specify, as a simulation parameter, a weather simulation context such as rainy, sunny, snowy, cold, warn, etc.

As used herein, the phrase "simulation protocol" refers to computer logic and programming that, when implemented, causes a separate digital sign to display context-dependent electronic content based on one or more simulation parameters. As an example, if a user provides a simulation parameter for a weather context, such as rainy weather, the simulation protocol—when executed on the digital sign—would display context-dependent electronic content that is associated with rainy weather, such as a rain gear ad. If the user wants to display a bathing suit ad, regardless of the context at or near the digital sign, execution of the simulation protocol for the bathing suit ad at the digital sign results on display of the bathing suit ad on the digital sign.

Example System Architecture

Turning now to the drawings, in which like numerals indicate like (but not necessarily identical) elements throughout the figures, example embodiments are described in detail.

FIG. 1 is a block diagram depicting a computer network environment and system for simulating context-dependent electronic content on a digital sign, in accordance with certain example embodiments. As depicted in FIG. 1, the exemplary operating environment 100 includes a electronic content management computing system 110 (or "CMS") and a separate digital sign computing system 120 (or "RDSS") that are configured to interact with each other over the network 105.

Each network 105 includes a wired or wireless telecommunication means by which network devices 110 and 120 can exchange data. For example, each network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages.

Each device 110 and 120 of the system 100 includes a communication module (not shown) capable of transmitting and receiving data over the distributed network 105. As those skilled in the art will appreciate, the CMS 110 and RDSS 120 can be a desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110 and 120 are operated by end-users or consumers, electronic content management system managers or operators, separate digital sign system managers, merchant operators, or combinations thereof.

The user 101 can employ a communication application 111 of the CMS 110, such as a web browser 112 application or a stand-alone application, to view, download, upload, or otherwise access and/or interact with the CMS 110. The CMS 110 can also include a content generation application 113 that the user 101 can employ, for example, to generate electronic content, including context-dependent electronic content. For example, the user 101, such as a designer of electronic content, can generate the electronic content using the content generation application 113, and thereafter use the communication application 111 to upload the electronic content to the CMS 110. Additionally, or alternatively, the user 101 may create the electronic content using a stand-alone application on the CMS 110 or using an application on a different computing device (not shown) that is connected to the network 105, thereafter uploading the created electronic content to the CMS 110 via the communication application 111.

As shown in FIG. 1, the CMS 110 can also include a context rule management application 114. The context rule management application 114, for example, provides a user interface that allows the user to create and/or assign context rules to created electronic content. For example, the context rule management application 114 may provide various user control options that allow a user to select a context in which to display a particular electronic content. The CMS 110 can likewise include a simulation application 115. A user 101, such as an electronic content designer or other individual wishing to simulate electronic content on a digital sign as described herein, can access the simulation application 115 to input simulation parameters into the CMS. For example, the simulation application 115 application may include a user interface providing various user control options that the user can select to input one or more simulation parameters into the CMS. In certain example embodiments, the context rule management application 114, the simulation application 115, and the communication application 111 may be integrated together, in whole or in part.

The data management module 116 represents the computer-implemented system component of the CMS 110 that, for example, receives and processes the input of electronic content, receives and processes the association of context rules with the electronic content, the input of simulation parameters, and processes the generation of a simulation protocol. In certain example embodiments, the data management module 116 may be a server or other data processing component. The CMS 110 also includes an accessible data storage unit 117 that can be used, for example, to store electronic content, context rules, simulation parameters, and other information. The example data storage unit 117 can include one or more tangible computer-readable media, and can be either stored on the CMS 110 or logically coupled to the CMS 110. The data storage unit 117 can include on-board flash memory and/or one or more removable memory cards or removable flash memory.

The separate digital sign system 120 represents the system of the operating environment 100 that is responsible for displaying electronic content, such as context-dependent electronic content. In certain example embodiments, the separate digital sign system 120 comprises an audiovisual display 121 and display processing module 122. The audiovisual display 121, for example, displays electronic content to one or more users 101, such as to customers in a merchant storefront and/or the creator of the electronic content. The audiovisual display 121 may also be configured to receive information, such as user input via a capacitive touch display screen.

The display processing module 122, for example, represents the computer-implemented system component of the RDSS 120 that receives information from the CMS 110, such as electronic content, context rules, and simulation protocols. The display processing module 122 then processes the received information for display on the audiovisual display 121. In certain example embodiments, the RDSS 120 may perform functions similar to the data management module 115 of the CMS 110. For example, the display processing module 122 may receive electronic content, either directly such as through a user interface of the RDSS 120 (not shown) or indirectly via the network 105, then associate the electronic content with context rules. In certain example embodiments, the RDSS 120 includes or is associated with a server (not shown), with one or more functions of the display processing module 122 being performed by the server. In certain example embodiments, the display processing module 122 may include a web crawler 126, which can obtain and receive information from the web. For example, the web crawler may receive context information, such as local current whether conditions or upcoming weather conditions.

As shown in FIG. 1, the example RDSS 120 also includes an audiovisual input module 123, such as a video camera 124 and associated audio input. The video camera 124, for example, can be the system component that scans a room for crowd size, lighting conditions, or other context information. The audio input portion of the audiovisual input module 123, for example, may detect sounds at or near the RDSS 120. For example, the audio input may detect thunder or other sounds. By communicating such video and/or audio information to the display processing module 122, for example, the display processing module 122 can determine—based on the context rules associated with the context-dependent electronic content—which electronic content to display on the audiovisual display 121 as described herein.

In the example environment of FIG. 1, the RDSS 120 also includes an accessible data storage unit 125 that can be used, for example, to store electronic content, context rules, simulation protocols, and other information. The example data storage unit 125 can include one or more tangible computer-readable media, and can be either stored on the RDSS 125 or logically coupled to the RDSS 120. The data storage unit 125 can include on-board flash memory and/or one or more removable memory cards or removable flash memory.

As those skilled in the art will appreciate, the network connections shown in FIG. 1 are examples only, inasmuch as other means of establishing a communications link between the computers and devices can be used. Further, the devices 110 and 120 and their components can have any of several other suitable computer system configurations. In certain example embodiments, one or more of the several components presented herein may be any type of computing device, including for example those discussed in more detail with respect to FIG. 6. Likewise, any modules or applications discussed herein or any other modules (scripts, web content, software, firmware, or hardware) may be performed or accomplished by any modules or application detailed in FIG. 6.

Example Processes

The components of the example operating environment 100 are described hereinafter with reference to the example methods and diagrams illustrated in FIGS. 2-4. The example methods of FIGS. 2-4 may also be performed with other systems and in other environments.

Figure 2:
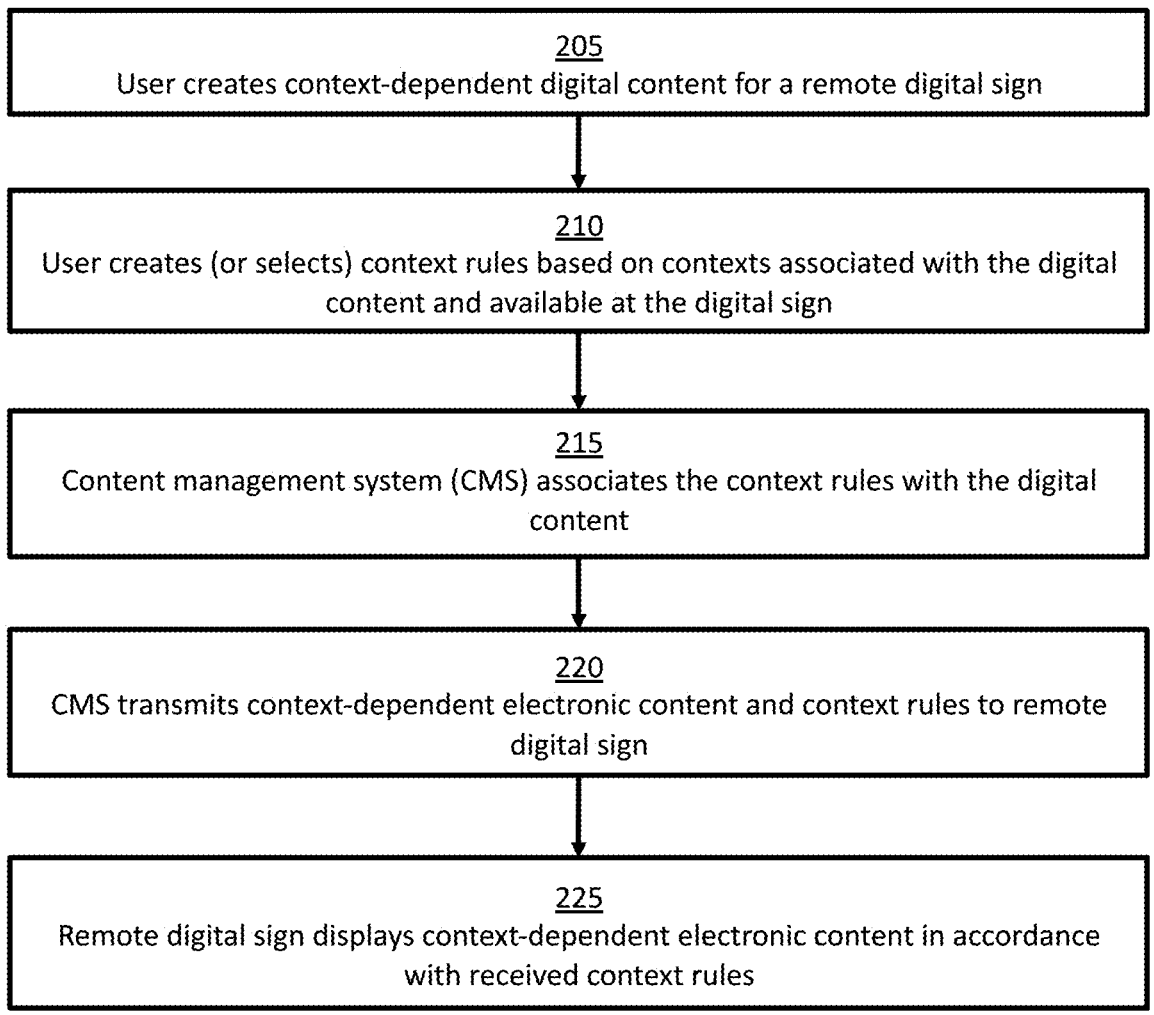
FIG. 2 is a block flow diagram depicting a method for displaying context-dependent content on a digital sign, in accordance with certain example embodiments.

FIG. 2 is a block flow diagram depicting a method 200 for displaying context-dependent content on a digital sign, in accordance with certain example embodiments.

With reference to FIGS. 1 and 2, in block 205 of FIG. 2, a user 101 creates context-dependent electronic content for a separate digital sign. That is, a user 101, such as a electronic content author, designs electronic content that can be displayed based on its context, and provides the electronic content to the CMS 110. In certain example embodiments, the user 101 uses the content generation application 113 to create the content and upload the content to the CMS. For example, the user 101 accesses a user interface of the content generation application 113 to create the electronic content. Additionally, or alternatively, the user 101 creates the electronic content using a separate content creation application, and then uploads the created electronic content to the CMS, such as via the content generation application 113 and/or the communication application 111.

As described herein, the created electronic content can be any context-dependent electronic content suitable for display on a digital sign. As examples, the electronic content may be a bathing suit ad for display in sunny weather, rain gear ad for display during rainy weather, or a pillow ad for display during after sunset. In certain example embodiments, the content may be an ad for rain gear that is designed to appear when thunder is detected at the location of the digital sign, such as via the audiovisual input module 123 of the RDSS 120.

In certain example embodiments, the user 101 may create an audio announcement to accompany the electronic content. For example, user 101 may create an announcement with a bathing suit ad that states "20% off on bathing suits" or "don't forget the sunscreen." In certain example embodiments, the user creates interactive electronic content. For example, the user may create a digital catalog that, when displayed, allows a customer to browse through the catalog on the audiovisual display 121. As those skilled in the art will appreciate, a user 101, such as a electronic content designer, can create a variety of different electronic contents that are compatible with the methods and systems described herein.

In block 210, the user 101 creates (or selects) context rules based on contexts associated with the electronic content and available at the digital sign. That is, the user 101 determines the context in which the created electronic content should be displayed and generates or chooses a rule for displaying the electronic content based on the determined context. For example, the user 101 may create or select a rule that dictates that the example bathing suit ad is to be displayed in sunny weather (a weather context) from sunrise to sunset (a time-of-day context). Likewise, the user may create a separate rule that dictates that the example rain gear ad is to be displayed—instead of the bathing suit ad—when it is either raining at or near the location of the digital sign or when thunder is detected at or near the location of the digital sign.

To create or select a context rule, for example, the user 101 may use the context rule management application 114 of the CMS 110. For example, the user 101 may access a user interface of the context rule management application 114. The user interface presents the user 101 with a set of uploaded electronic contents and a set of rules that can be paired with the various electronic contents. To create or select a rule with a particular electronic content, for example, the user 101 may select a user control option (button) and/or enter information into the context rule management application 114 that indicates that the particular electronic content should be paired with a particular context rule. For example, the user 101 may input a selectable context to pair with the electronic content. As an example, the user 101 may input daily display times and weather preferences for the display of the example bathing suit ad and rain gear ads, such that each ad is displayed during sunny weather (and daylights hours) and rainy weather, respectively. In other words, the "time of day" and "sunny weather" are selectable contexts that the user can pair with the example bathing suit ad.

In certain example embodiments, the user 101 may use the context rule management application 114 and/or the data management module 116 to create one or more new rules that can be paired with the electronic content. That is, instead of relying the CMS 110 to provide a rule, the user 101 assigns his or her own rule to the electronic content. For example, a user 101 may create a snowy weather rule that triggers the display of ski equipment during snowy weather.

In block 215, the CMS 110 associates the context rules with the electronic content. That is, one or more context rules are paired with the particular electronic contents based on the user's inputs and preferences. In certain example embodiments, the pairing of the electronic content with a context rule occurs via the data management module 116. For example, the user 101 provides the inputs into the context rule management application 114 as described herein, including the selection of rules, and the data management module 116 creates and assembles the computer logic necessary to implement the rule. The data management module 116 then pairs the specific context rule with the particular electronic content to be displayed when the rule is implemented. As an example, if the user 101 has specified that the example bathing suit ad is to be displayed from sunrise to sunset during sunny weather, the data management module 116, for example, will create and assemble the computer logic that, when executed, will cause the bathing suit ad to be displayed accordingly.

In block 220, the CMS 110 transmits context-dependent electronic content and context rules to the separate digital sign. That is, once the context-dependent electronic content is associated with a context, the CMS 110 sends the context-dependent electronic content and associated context rule to the RDSS 120. The RDSS 120 receives the context-dependent electronic content and associated context rule. In certain example embodiments, the RDSS 120 then stores the received context-dependent electronic content and associated context rule in the data storage unit 125 of the RDSS 120. Additionally, or alternatively, the RDSS 120 executes the context rules upon receipt, thereby displaying digital the electronic content according to the context rules.

In block 225, the separate digital sign displays context-dependent electronic content in accordance with the context rules. That is, based on the received context-dependent electronic content and context rules for displaying the electronic content, the RDSS 120 executes and implements the context rules. For example, if the context rule dictates that the example bathing suit ad is displayed during sunny, daylight hours, the display processing module 122 determines the daylight hours to display the ad and whether it is sunny. To make such determinations, for example, the display processing module 122 may employ an associated clock (not shown) and the web crawler 126 to obtain information regarding local weather conditions. In other example embodiments, the display processing module 122 may receive input from the audiovisual input module 123. For example, the audiovisual input module 124 may detect thunder, thereby triggering the display processing module 122 to execute context rules that dictate the display of rain gear ads when thunder is detected.

Once the display processing module 122, for example, determines the local context and determines which electronic content to display based on the local context and context rules, the audiovisual display 121 then displays the appropriate electronic content in accordance with the context rules. For example, if the current time is within the daylight hours and the weather is sunny, the display processing module 122 coordinates the display of the bathing suit ad on the audiovisual display 121. If thunder is detected, such as via the audiovisual input module 123—or if the web crawler 126 determines that the weather is cloudy or rainy—the display processing module 122 may change the displayed bathing suit ad to a rain gear ad, in accordance with the context rules.

By applying the different context rules to the various context-dependent electronic contents as described in blocks 205-225, different appearances on the audiovisual display 121 of the RDSS 120 are generated. For example, applying a context rule that dictates that the bathing suit ad is displayed in sunny weather results in the bathing suit ad being displayed in sunny weather. If it starts to rain, however, application of the rainy weather context rule will result in the display of the rain gear ad. Hence, the appearances of the audiovisual display 121 change, and are dictated by, the context rule that is applied. As such, the application of different context rules results in different appearances of content on the display.

Figure 3:
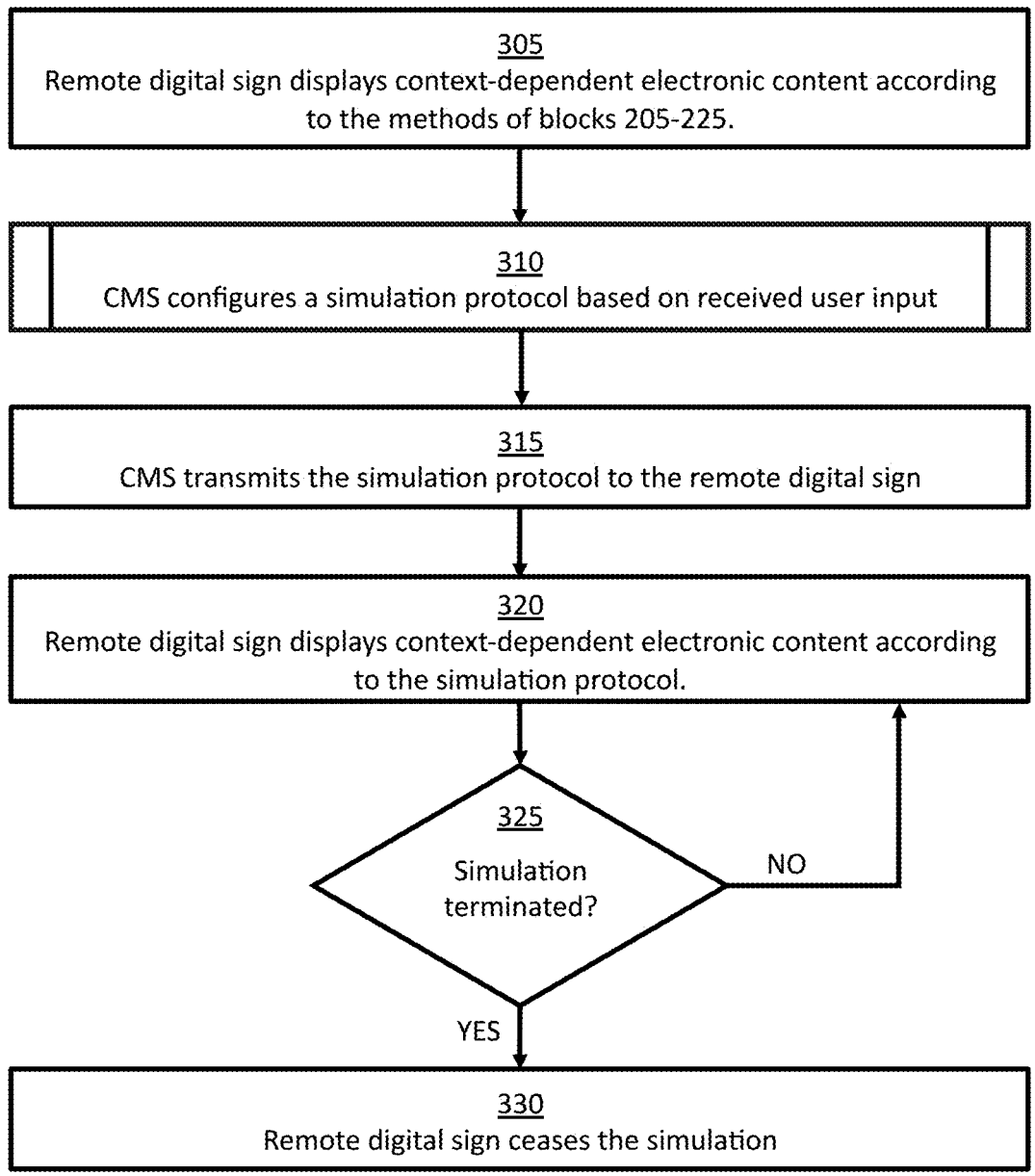
FIG. 3 is a block flow diagram depicting a method for displaying a simulation of context-dependent electronic content on a digital sign, in accordance with certain example embodiments.

FIG. 3 is a block flow diagram depicting a method 300 for displaying a simulation of context-dependent electronic content on a digital sign, in accordance with certain example embodiments.

In block 305, the separate digital sign displays context-dependent electronic content according to the methods of blocks 205-225. That is, the CMS 110 and the RDSS 120 operate to process and display context-dependent electronic content based on associated context rules, such as in a normal display mode. In other words, for example, if during the daylight hours the weather is sunny, the RDSS 120 will, via the audiovisual display 121, display the bathing suit ad. If rain moves in to the area at or near the digital sign, the RDSS 120 will display the rain gear ad. At night, for example, the RDSS 120 will display the pillow ad according to the nighttime context rule associated with pillow ad.

In block 305, the CMS 110 configures a simulation protocol based on received user input from the user 101. That is, the user provides simulation parameters to the CMS 110, such as via the simulation application 115, and the CMS 110 creates and transmits the simulation protocol to the RDSS 120. The details of block 305 are described in further detail below with reference to FIG. 4.

Figure 4:
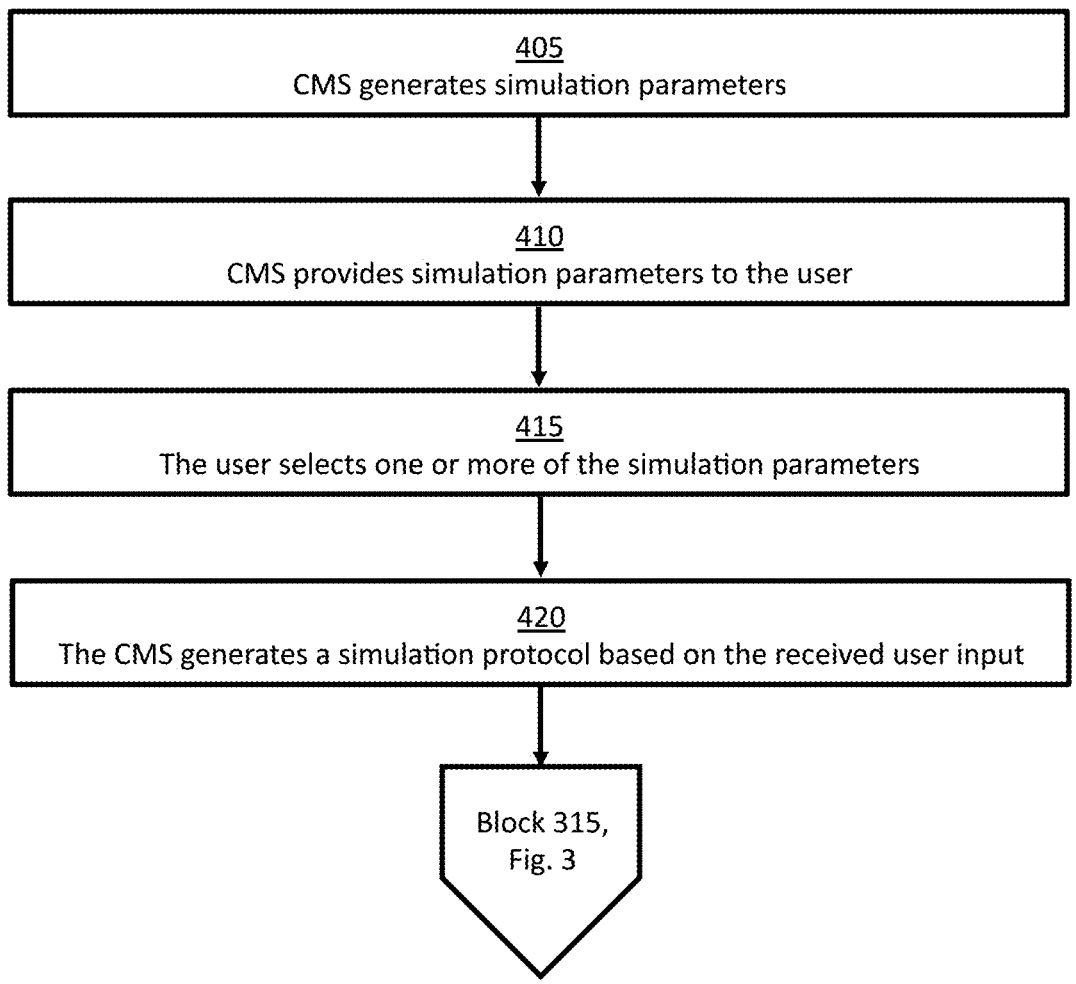
FIG. 4 is a block flow diagram depicting a method for configuring a simulation protocol, in accordance with certain example embodiments.

FIG. 4 is a block flow diagram depicting a method for configuring a simulation protocol, in accordance with certain example embodiments.

With reference to FIG. 4, in block 405 of method 310, the CMS 110 generates simulation parameters. That is, the CMS 110, such as via the data management module 116 and and/or the simulation application 115, assembles a list or group of options that a user 101 can employ to run a simulation on the RDSS 120. The simulation parameters can be any number of simulation parameters that a user may wish to simulate on the RDSS 120. For example, a simulation parameter for the bathing suit ad may include an option for running the particular bathing suit ad on the RDSS 120, regardless of the context at or near the digital sign and/or the context rules associated with the bathing suit ad. For example, the simulation may run the bathing suit ad in during a thunderstorm. Additionally, or alternatively, the simulation parameter may include an option to apply a rainy weather context so that, even it is not raining, electronic content associated with (and triggered by) context rules for raining weather is displayed on the audiovisual display 121 of the RDSS 120. For example, all rainy weather content, or a particular rainy weather content, can be displayed via the simulation, regardless of the actual weather.

In certain example embodiments, the CMS 110 generates the simulation parameters based on existing electronic content and context rules stored at the CMS, such as on the data storage unit 117 of the CMS. For example, the data management module 116 may scan or otherwise read the electronic content and context rules to create simulation parameters. In such example embodiments, the data management module 116 may determine from the bathing suit ad and rain gear ad that contexts exist for sunny weather, rainy weather, and time-of-day, thereby creating simulation parameters for sunny weather, rainy weather, and time-of-day. Additionally, or alternatively, a user 101 may create or add simulation parameters, such as via the simulation application 115. For example, a user may access a user interface of the simulation application 115 to create a specific simulation parameter.

In block 410, the CMS 110 provides simulation parameters to the user 101. That is, the CMS presents the user 101 with the simulation parameters such that the user 101 can select one or more of the simulation parameters. For example, the CMS 110 may, such as via a user interface of the simulation application 115, provide the user 101 with several selectable user control options (buttons) that the user 101 can select, thereby inputting the selection of a simulation parameter into the CMS 110.

The user control options can include—and correspond to—any type of simulation parameter. For example, the user control option may be an option to simulate a particulate content irrespective of the context and/or context rule associated with the electronic content. Additionally, or alternatively, the user control option may present a "rainy weather," "sunny weather," "nighttime" or other type of simulation parameter to the user 101, such as via the simulation application 115. For example, the CMS 110 may present a rainy weather simulation parameter as a "display rainy weather content" option that the user 101 can select. In other example embodiments, the option for simulating the example bathing suit ad may state "display bathing suit ad regardless of context," thus allowing the user 101 the option to simulate electronic content irrespective of the context and/or context rules associated with the electronic content.

In block 415, the user 101 selects one or more of the simulation parameters. That is, when the CMS provides simulation parameters to the user 101, such as via various user control options presented to the user via a user interface of the simulation application 115, the user 101 selects the user control options corresponding to the simulation parameters that the user 101 desires to run. For example, if the user 101 wishes to see various rainy weather electronic content, even if it is sunny outside, the user 101 might select the "display rainy weather content" user control option. If the user wishes to simulate the example bathing suit ad despite the presence of rainy weather at or near the location of the digital sign, the user might select an option for "display bathing suit ad regardless of context," thereby selecting a simulation parameter that would result in the bathing suit ad being displayed even in the actual context is raining, as described further herein.

In block 420, the CMS 110 generates a simulation protocol based on the received user input. That is, the CMS 110, such as via the data management module 116, assembles each of the user's selected simulation parameters into computer programming logic that, when executed, simulates the display of the context-dependent electronic content as described herein. For example, if the user 101 selects a control option to "display bathing suit ad regardless of context," the CMS 110 will create logic that, when executed, displays the example bathing suit ad irrespective of the fact that it could be raining at or near the location of the digital sign. Additionally, or alternatively, if the user 101 selects a user control option corresponding to "display rainy weather content," the CMS 110 generates a simulation protocol that, when executed, results in the display of electronic content, such as a rain gear ad, being displayed irrespective of the actual weather context at or near the digital sign.

In certain example embodiments, the CMS 110 may generate a simulation protocol that results in the application of one or more of the previously deployed context rules, thereby simulating one or more of the different appearances of the electronic content. For example, the selection of a rainy weather user control option (and hence a rainy weather simulation parameter) may, in certain example embodiments, generate a simulation protocol that—when executed at the RDSS—triggers a rainy weather context rule to be executed (even if the weather is sunny). By triggering the rainy weather context rule to be executed, for example, the simulation protocol causes the audiovisual display 121 to display the electronic content associated with the particular rule to be displayed. In such a simulation and with the example rain gear ad, for instance, execution of rainy weather context rule would trigger the rain gear ad to be displayed during a simulation, even if the weather at or near the digital sign was sunny.

In certain example embodiments, the simulation protocol can be stored in a datastore on the CMS 110, such as on the data storage unit 117 of the CMS 110. For example, the simulation protocol can be stored with other simulation protocols to create a datastore of simulation protocols for future use. The simulation protocol can then be pushed to the RDSS 120 for execution (or the RDSS can pull the simulation protocol), as described herein. In certain example embodiments, the simulation protocols can be stored on RDSS 120, such as in the data storage unit 125 of the RDSS 120.

Returning to FIG. 3, in block 315 of FIG. 3, once the CMS 110 configures a simulation protocol, the CMS transmits the simulation protocol to the separate digital sign. That is, the CMS sends the simulation protocol to the RDSS 120 via the network 105, and the RDSS 120 receives the simulation protocol via the network 105. In certain example embodiments, the RDSS 120 executes the simulation protocol as described herein upon receipt. Additionally, or alternatively, the RDSS 120 may store the simulation protocol in the data storage unit 125 of the RDSS 120.

In block 320, the separate digital sign displays context-dependent electronic content according to the simulation protocol. That is, once the RDSS 120 receives the simulation protocol from the CMS 110, the RDSS 120, such as via the display processing module 122, switches from a normal mode of displaying the context-dependent electronic content according to the context rules and instead displays the context-dependent electronic content according to the simulation context. Hence, if the simulation protocol dictates that the RDSS 110 displays the example bathing suit ad regardless of the weather and a previously associated "sunny weather" context rule, the RDSS 120, via the display processing module 122, will cause the audiovisual display 121 to display the bathing suit ad.

Likewise, if the simulation protocol dictates that the example rain gear ad is to be displayed at present—even if the rain gear ad was previously associated with a rainy weather context rule and its is currently sunny outside—the application of the simulation protocol will trigger the audiovisual display 121 of the RDSS 120 to display the rain gear ad. Further, if the simulation protocol dictates that a particular one of the context rules that the RDSS 120 previously received is to be executed, the simulation protocol will trigger the audiovisual display 121 of the RDSS 120 to display the content associated with the previously received content rule.

By applying and executing the simulation protocol, the RDSS 120 allows the user 101, such as the designer of the electronic content, to view his or her electronic content on the actual digital sign, regardless of the context. This includes the display of the content without the simulation being obscured with simulation controls and other features on a simulated digital sign. Further, by viewing the simulation on the actual digital sign, the user 101 is given the confidence that the content that he or she prepared will work as expected in the various contexts for which it is configured and will fit and otherwise appear as desired for the actual digital sign display characteristics. For example, using the methods described in blocks 305-320, the user 101 can change which content is displayed the audiovisual display 121 of the RDSS 120 at his or her leisure. This is important, as the user 101 can, if needed, make changes to any of his or her context-dependent electronic content without having to waste time waiting on actual contexts to change at or near the location of the digital sign. For example, to check that the content of the example bathing suit ad looks and displays properly on the digital sign, the user 101 can run a simulation as described herein at any time, thereby giving the user 101 broad control over adjusting the sign to fit the size of the audiovisual display 121, for example. Such simulations are particularly helpful, for example, when multiple displays are used to generate an image, and the user 101 needs to check his or her work on the multiple displays by running a simulation as described herein.

In certain example embodiments, the methods described herein to simulate context-dependent content can be repeated such that the user 101 can change the appearance of electronic content on the digital sign as he or she wishes. For example, the user 101 may run a rainy weather context simulation according to the methods described in FIGS. 3 and 4. During the simulation, the user 101 may provide a second user input specifying one or more second simulation parameters, via the simulation application 115, to change the appearance on the RDSS 120 to a sunny weather context. Based on the received second input, the CMS 110 generates a second simulation protocol, which the RDSS 120 then receives and executes as described herein. The RDSS 120 then displays the electronic content based on the received second simulation protocol. For example, the RDSS 120 changes the appearance on the digital sign to content associated with a sunny weather context (when the second simulation protocol dictates a sunny weather simulation).

In response to receiving the simulation protocol, for example, the RDSS 120 can continue to execute the simulation protocol until a command is received to terminate the protocol. In certain example embodiments, when specifying simulation parameters as described in block 415 of FIG. 4, the user 101 may provide a timeframe for running the simulation protocol on the RDSS 110. For example, the user 101 may specify that the simulation protocol is to run for 5, 10, 15 or 20 minutes. In which case, when the CMS 110 transmits the simulation protocol to the RDSS 120 according to block 315, the CMS 110 also transmits the commands for when to terminate the simulation.

In other example embodiments, the user 101 may specify that the simulation protocol is to run until the user 101 provides a termination command. For example, when the user is providing simulation parameters, the user 101 may be presented with a user control option on a user interface of the simulation application 115 that allows the user 101 to "Run Simulation Protocol Indefinitely," the selection of which results in execution of the simulation protocol until the user 101 specifies that the simulation is to end. That is, the user 101 may run a simulation protocol according to the methods and systems described herein and select a "Run Simulation Protocol Indefinitely" option, in which case the RDSS 120 does not receive a simulation termination command until the user 101 specifies the termination. Thereafter, once the simulation is underway on the RDSS 120, the simulation application 115, for example, may provide the user 101 with a user control option to "Terminate Simulation Now." Upon selection of the "Terminate Simulation Now" user control option, for example, the CMS 110, such as via the data management module 116, processes and transmits a termination command to the RDSS 120 via the network 105. The RDSS 120 then receives the termination command via the network 105.

In block 325, if the RDSS 120 does not receive a timeframe for ceasing the simulation—or if the RDSS 120 does not receive a termination command from the CMS 120—the method will follow the "NO" branch of block 325. That is, the RDSS 120 will keep running the simulation of the electronic content according to the simulation protocol as described in block 320 of FIG. 3. In contrast, if the RDSS 120 receives a timeframe for ceasing the simulation—or if the RDSS 120 receives a termination command from the CMS 120—the method will follow the "YES" branch of block 325 to block 330.

In block 330, the separate digital sign ceases the simulation. That is, the RDSS 120 ends execution of the simulation protocol, which results in the RDSS 120 displaying the context-dependent electronic content according to the context rules as described in block 225 of FIG. 2. If, for example, the CMS 110 transmits a termination timeframe with the simulation protocol, then the RDSS 120 end the simulation according the timeframe. For example, the RDSS 120 will terminate the simulation after 5, 10, 15, or 20 minutes, or other specified time. In example embodiments where the CMS 110 sends a termination command following a user input to terminate the simulation, such as with a "Terminate Simulation Now" command, the RDSS 120 terminates the simulation in accordance with the command.

Upon executing the termination of a simulation, the RDSS 120 returns to displaying the context-dependent electronic content in accordance with the context rules. For example, if the example bathing suit ad is associated with context rules to display the ad during the daylight hours and sunny weather—but the simulation protocol causes the ad to be displayed in any weather—the RDSS 120 will, upon receiving and executing a termination command, return to displaying the bathing suit only during daylight hours and sunny weather (i.e., according to the associated context rules). As another example, if the simulation protocol results in the display of all rainy-weather context ads (regardless of the weather at or near the location of the sign), ceasing the simulation will cause the RDSS 120 to display the context-dependent electronic content according to the weather context present at or near the digital sign. That is, the RDSS 120 will return to displaying rainy-weather context ads, such as rain gear ads, in rainy weather while displaying sunny weather context ads in sunny weather.

Figure 5:
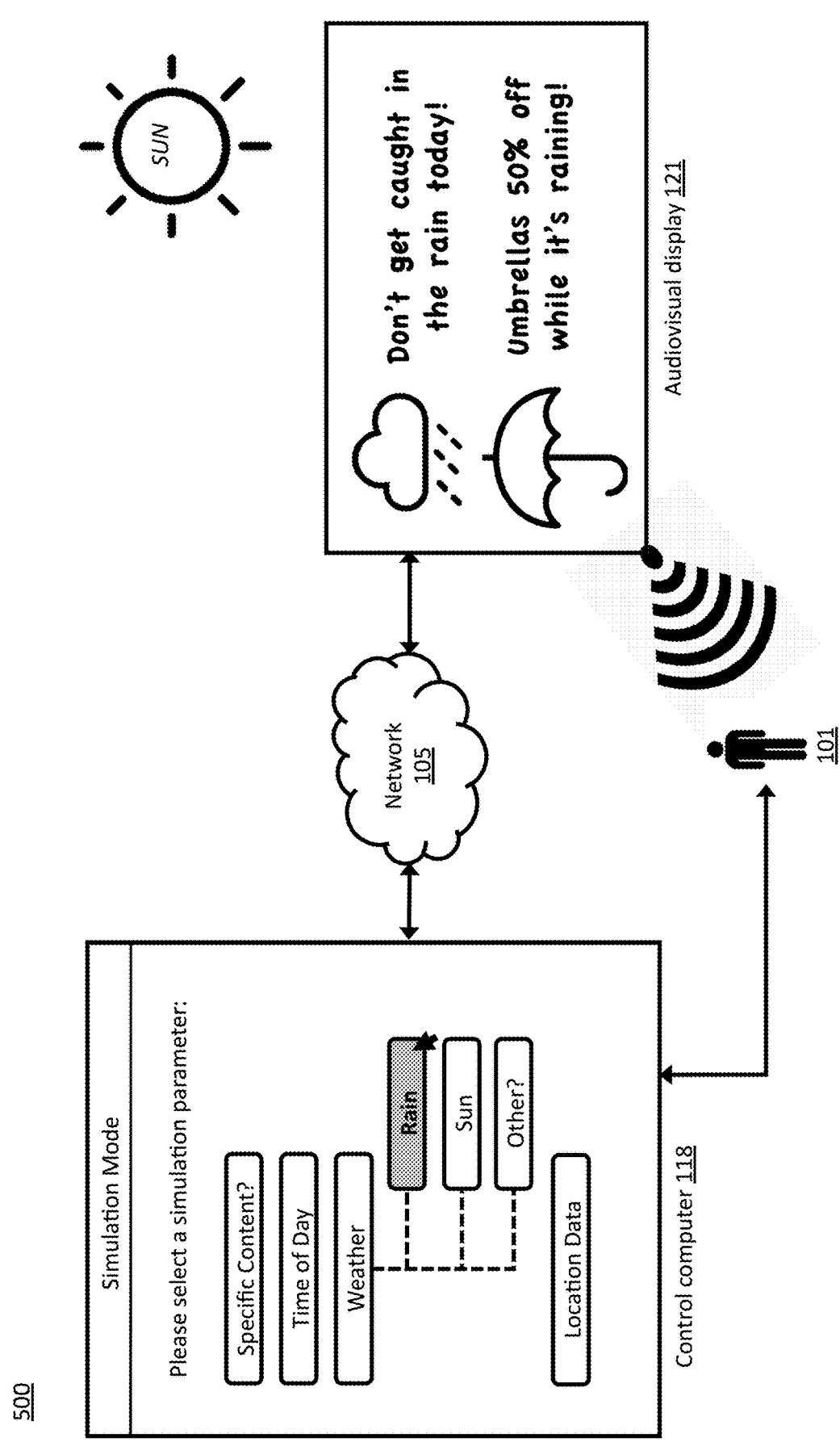
FIG. 5 is an illustration showing a user interface for selecting context simulation parameters, in accordance with certain example embodiments.

FIG. 5 is an illustration showing a user interface for selecting context simulation parameters, in accordance with certain example embodiments. As shown, provided is a user interface for an example control computer 118 of the content management system 110. In the "Simulation Mode," several selectable simulation parameters are displayed to the user 101, such as "Specific Content?," "Time of Day," "Weather," "Location Data," etc. Selection of one of the simulation parameters may bring up an additional list of more specific simulation parameters. For example, selection of "Specific Content?" may result in the display of specific electronic contents, such as a specific ad that user 101 would like to simulation, regardless of the context present at the location of the audiovisual display of the remote digital sign system 120. Section of "Time of Day," for example, may allow the user to select "nighttime" or "daytime" hours. Selection of "Location Data," for example, may ask the user to simulate the number of people present at the location of the audiovisual display of the remote digital sign system 120, such as "Single User Present" or "Crowd Present." As those skilled in the art will appreciate based on the disclosure provided herein, a variety of selectable simulation parameters may be displayed to the user 101.

As shown in the example of FIG. 5, the user 101 has selected "Weather," which results in the display of additional selectable user control options for "Rain," "Sun," or "Other." Selection of the "Other" option, for example, may result in the display of specific temperature simulation parameters, such as "Cold Outside" or "Hot Outside" or "Strong Winds." As shown in FIG. 5, the user 101 selects a user control option for "Rain," thereby triggering the display of rainy weather context electronic content on the audiovisual display of the remote digital sign system 120. With this selection, the audiovisual display 121 of the remote digital sign system 120 displays an example umbrella ad, despite the actual context at the audiovisual display 121 of the remote digital sign system 120 being sunny. The user 101 can then view the electronic content for the rainy weather context umbrella ad—as that ad will appear on the audiovisual display of the remote digital sign system 120—during sunny weather.

Example Computing Environment

Figure 6:
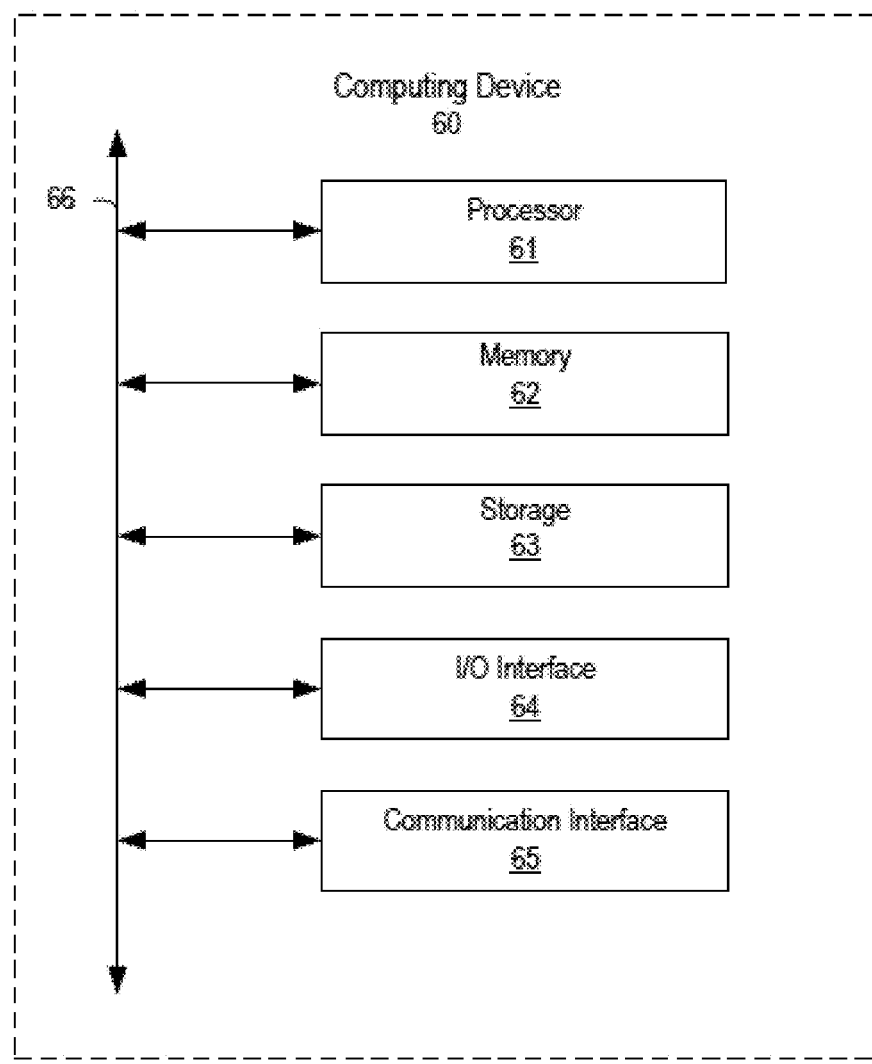
FIG. 6 is a block diagram depicting an example hardware implementation, in accordance with certain example embodiments.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for simulating context-dependent electronic content on a digital sign, the method comprising:
   a computing device transmitting electronic content and context rules to the digital sign, wherein application of the context rules provides different appearances of the electronic content on the digital sign based on different physical contexts proximate to a physical location of the digital sign and wherein the digital sign is a hardware device having a display, with display characteristics, that is separate from the computing device;
   the computing device receiving, while an existing physical context of the different physical contexts exists at the physical location of the digital sign and while an existing appearance of the different appearances of the electronic content is displayed on the digital sign based on the existing physical context at the physical location of the digital sign, a user input specifying a simulation parameter for the electronic content, the simulation parameter specifying a simulated physical context at the digital sign that is different from the existing physical context;

in response to receiving the user input, the computing device generating a simulation protocol for displaying a simulation of the electronic content on the digital sign in accordance with the simulated physical context; and the computing device transmitting the simulation protocol to the digital sign, thereby causing the electronic content to be simulated and displayed on the display of the digital sign according to the simulation protocol, with a displayed appearance that differs from the existing appearance, the displayed appearance being based on the simulated physical context rather than the existing physical context of the digital sign, thereby violating the context rules loaded in the digital sign while the electronic content is simulated and displayed.

2. The method of claim 1, wherein the electronic content is simulated by applying the context rules using the simulated physical context to display one of the different appearances of the electronic content.

3. The method of claim 1 further comprising:

receiving, by the computing device, a second user input specifying a second simulation physical context for a simulation of a second electronic content on the digital sign, wherein the second simulation physical context differs from the first simulation physical context;

generating, by the computing device, a second simulation protocol for displaying the second electronic content on the digital sign; and transmitting, by the computing device, the second simulation protocol to the digital sign, wherein the electronic content is simulated for the second simulation parameter at the digital sign according to the second simulation protocol.

4. The method of claim 1, wherein generating the simulation protocol further comprises updating, by the computing device, a datastore based on the user input specifying the simulation parameter, wherein the digital sign receives the simulation protocol from the datastore.

5. The method of claim 1, further comprising providing, by the computing device, a user interface, the user interface comprising selectable physical contexts for the context rules, wherein the selectable physical contexts identify the different physical contexts for which the context rules will be applied to provide the different appearances of the electronic content and wherein the user input specifying the simulation physical context selects one of the physical contexts.

6. The method of claim 5, wherein transmitting the context rules to the digital sign comprises updating, by the computing device, a datastore based on the context options being specified on the user interface, wherein the digital sign receives the context rules from the datastore.

7. The method of claim 1 further comprising terminating, by the computing device, simulation on the digital sign, wherein the digital sign returns to providing the electronic content in a normal mode according to the existing physical context rather than the simulated physical context.

8. The method of claim 7, wherein the normal mode applies the context rules to the electronic content.

9. The method of claim 1, wherein the electronic content displayed on the digital sign is dynamic content that changes in appearance over time based on application of the context rules.

10. The method of claim 1, wherein the simulation protocol specifies lighting, temperature, humidity, weather, audience size, a variable environmental condition, or combination thereof at a location of the digital sign.

11. The method of claim 1, wherein the digital sign comprises multiple, adjacent display devices, each of the display devices displaying a different respective portion of the electronic content.

12. The method of claim 1, wherein transmission of the electronic content, the context rules, and the simulation protocol to the digital sign occurs over a network.

13. The method of claim 1, wherein the electronic content comprises an image, a video, or an interactive application.

14. A computer-implemented method for displaying a simulation of context-dependent electronic content, the method comprising:

a digital sign receiving electronic content and context rules for displaying the electronic content from a computing device;

the digital sign applying the context rules to display the electronic content, wherein application of the context rules provides different appearances of the electronic content on the digital sign based on different physical contexts proximate to a physical location of the digital sign, and wherein the digital sign is a hardware device having a display and associated display characteristics, and is separate from the computing device;

the digital sign receiving, while an existing physical context of the different physical contexts exists at the physical location of the digital sign and while an existing appearance of the different appearances of the electronic content is displayed on the digital sign based on the existing physical context at the physical location of the digital sign, a simulation protocol for displaying a simulation of the electronic content on the digital sign, the simulation protocol specifying a simulated physical context at the digital sign that is different from the existing physical context; and in response to receiving the simulation protocol, the digital sign displaying the simulation of the electronic content according to the simulation protocol with a displayed appearance that differs from the existing appearance, the displayed appearance being based on the simulated physical context rather than the existing physical context of the digital sign, thereby violating the context rules loaded in the digital sign while the electronic content is simulated and displayed.

15. The method of claim 14 further comprising:

receiving, by the digital sign, a termination command to terminate the simulation;

in response to receiving the termination command, displaying the electronic content according to the context rules and the existing physical context present at the digital sign.

16. The method of claim 14, wherein the simulation protocol specifies lighting, temperature, humidity, weather, audience size, a variable environmental condition, or combination thereof at a location at which the digital sign is or will be deployed.

17. A system comprising:

a processor; and a non-transitory computer readable medium comprising instructions, wherein, when the instructions are executed by the processor, the processor performs operations comprising:

transmitting electronic content and context rules to a digital sign, wherein application of the context rule provides different appearances of the electronic content on the digital sign based on different physical contexts proximate to a physical location of the digital sign, wherein the digital sign is a hardware device having a display, with display characteristics, and is separate from the system;

receiving, while an existing physical context of the different physical contexts exists at the physical location of the digital sign and while an existing appearance of the different appearances of the electronic content is displayed on the digital sign based on the existing physical context at the physical location of the digital sign, a user input specifying a simulation parameter for the electronic content, the simulation parameter specifying a simulated physical context at the digital sign that is different from the existing physical context;

in response to receiving the user input, generating a simulation protocol for displaying a simulation of the electronic content on the digital sign in accordance with the simulated physical context; and transmitting the simulation protocol to the digital sign, thereby causing the electronic content to be simulated at the digital sign according to the simulation protocol, with a displayed appearance that differs from the existing appearance, the displayed appearance being based on the simulated physical context rather than the existing physical context of the digital sign, thereby violating the context rules loaded in the digital sign while the electronic content is simulated and displayed.

* * * * *